US008676156B1

(12) United States Patent
Oroskar et al.

(10) Patent No.: US 8,676,156 B1
(45) Date of Patent: Mar. 18, 2014

(54) METHOD AND SYSTEM FOR MANAGING CALLS

(75) Inventors: Siddharth S. Oroskar, Overland Park, KS (US); Sachin R. Vargantwar, Overland Park, KS (US); Jasinder P. Singh, Olathe, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 328 days.

(21) Appl. No.: 13/048,094

(22) Filed: Mar. 15, 2011

Related U.S. Application Data

(63) Continuation-in-part of application No. 12/904,396, filed on Oct. 14, 2010.

(51) Int. Cl.
*H04M 11/00* (2006.01)

(52) U.S. Cl.
USPC ..... 455/406; 455/405; 455/414.1; 455/432.1; 455/432.3; 455/552.1

(58) Field of Classification Search
USPC ............. 455/405, 414.1, 414.4, 432.1, 432.2, 455/432.3, 434, 435.2, 466, 567, 406
See application file for complete search history.

(56) References Cited

U.S. PATENT DOCUMENTS

| 5,446,553 | A  | * | 8/1995 | Grube ........................... 358/402 |
| 6,490,450 | B1 | * | 12/2002 | Batni et al. .................... 455/433 |
| 7,542,558 | B2 |   | 6/2009 | Klein et al. |
| 2001/0031633 | A1 | * | 10/2001 | Tuomela et al. .............. 455/417 |
| 2003/0131069 | A1 |   | 7/2003 | Lucovsky et al. |
| 2003/0223426 | A1 | * | 12/2003 | Requena et al. ........... 370/395.2 |
| 2005/0100145 | A1 |   | 5/2005 | Spencer et al. |
| 2005/0169446 | A1 |   | 8/2005 | Randall et al. |
| 2005/0198096 | A1 |   | 9/2005 | Shaffer et al. |
| 2006/0063563 | A1 |   | 3/2006 | Kaufman |
| 2006/0148495 | A1 | * | 7/2006 | Wilson .......................... 455/466 |
| 2008/0254817 | A1 | * | 10/2008 | Tornkvist ...................... 455/466 |
| 2009/0170470 | A1 | * | 7/2009 | Giraud et al. ................. 455/406 |
| 2009/0170532 | A1 |   | 7/2009 | Lee et al. |
| 2009/0318141 | A1 | * | 12/2009 | Benco et al. ................ 455/432.1 |
| 2012/0311029 | A1 | * | 12/2012 | Schuster et al. .............. 709/204 |
| 2013/0065582 | A1 | * | 3/2013 | Jiang .......................... 455/432.1 |

* cited by examiner

*Primary Examiner* — Jean Gelin

(57) ABSTRACT

A method to manage a call in a communication system and an access node of the communication system are disclosed. The method includes receiving, by the communication system, a call request for a voice call from a first device to communicate with a second device, wherein the second device is a subscriber of the communication system, and transmitting, by the communication system to the first device, a first message comprising an indication that the second device is operating in a text message-only mode, when the second device is roaming and a roaming usage of the second device meets a roaming criteria. The access node may be configured to transmit to the first device the first message, when the first device requests to establish a call with the second device through the access node, the second device is roaming, and a roaming usage of the second device meets the roaming criteria.

18 Claims, 7 Drawing Sheets

METHOD AND SYSTEM FOR MANAGING CALLS

CROSS REFERENCE TO RELATED APPLICATIONS

This is a continuation-in-part of Non-Provisional patent application Ser. No. 12/904,396, filed Oct. 14, 2010, the entire content of which is incorporated herein by reference.

TECHNICAL BACKGROUND

Wireless communication systems have become an important means by which many people worldwide have come to communicate. A wireless communication system may provide communication for a plurality of wireless devices, each of which may be serviced by an access node of the communication system.

Generally, a wireless customer subscribes to a wireless communication system managed by a network operator and has the ability to roam to other wireless communication systems. The wireless customer may also subscribe to other wireless communication systems managed by the same network operator or by other network operators. Network operators would generally reach roaming agreements with other network operators to allow their subscribers to roam to other wireless communication systems.

It may be desirable for a network operator to manage a wireless subscriber when roaming into other wireless communication systems. For example, when the wireless subscriber roams into an area served by a second communication system, managed by a second network operator, the second network operator may charge the subscriber's network operator charges associated with the roaming usage. Depending on the subscription agreement between the wireless subscriber and the subscriber's network operator, the charges associated with the roaming usage may or may not be passed along to the wireless subscriber. Thus, it may be beneficial for a network operator, and/or its wireless subscribers, to minimize charges associated with roaming.

OVERVIEW

A method to manage a call in a communication system is disclosed. The method includes receiving, by the communication system, a call request for a voice call from a first device to communicate with a second device, wherein the second device is a subscriber of the communication system, and transmitting, by the communication system to the first device, a first message comprising an indication that the second device is operating in a text message-only mode, when the second device is roaming and a roaming usage of the second device meets a roaming criteria.

An access node of a wireless communication system is disclosed. The access node includes a radio frequency interface to communicate through a wireless communication link with a subscriber device of the wireless communication system, a data communication interface to communicate through a network communication link with a communication network, and a processing system to process data associated with the wireless communication link and the network communication link, wherein the processing system comprises a storage unit and a processing unit.

The access node may be configured to transmit to a calling device a first message comprising an indication that a subscriber device is operating in a text message-only mode, when the calling device requests to establish a call with the subscriber device, the subscriber device is roaming, and a roaming usage of the subscriber device meets a roaming criteria.

DETAILED DESCRIPTION

It is to be understood that both the foregoing general description and the following detailed description are exemplary and explanatory only and are not restrictive of the present invention, as claimed.

The following detailed description and accompanying drawings teach the best mode of the invention. For the purpose of teaching inventive principles, some conventional aspects of the best mode may be simplified or omitted. The appended claims specify the scope of the invention. Some aspects of the best mode may not fall within the scope of the invention as specified by the claims, and thus, those skilled in the art will appreciate variations from the best mode that fall within the scope of the invention. Those skilled in the art will also appreciate that the features described below can be combined in various ways to form multiple variations of the invention. As a result, the invention is not limited to the specific examples described below, but only by the claims and their equivalents.

Figure 1:
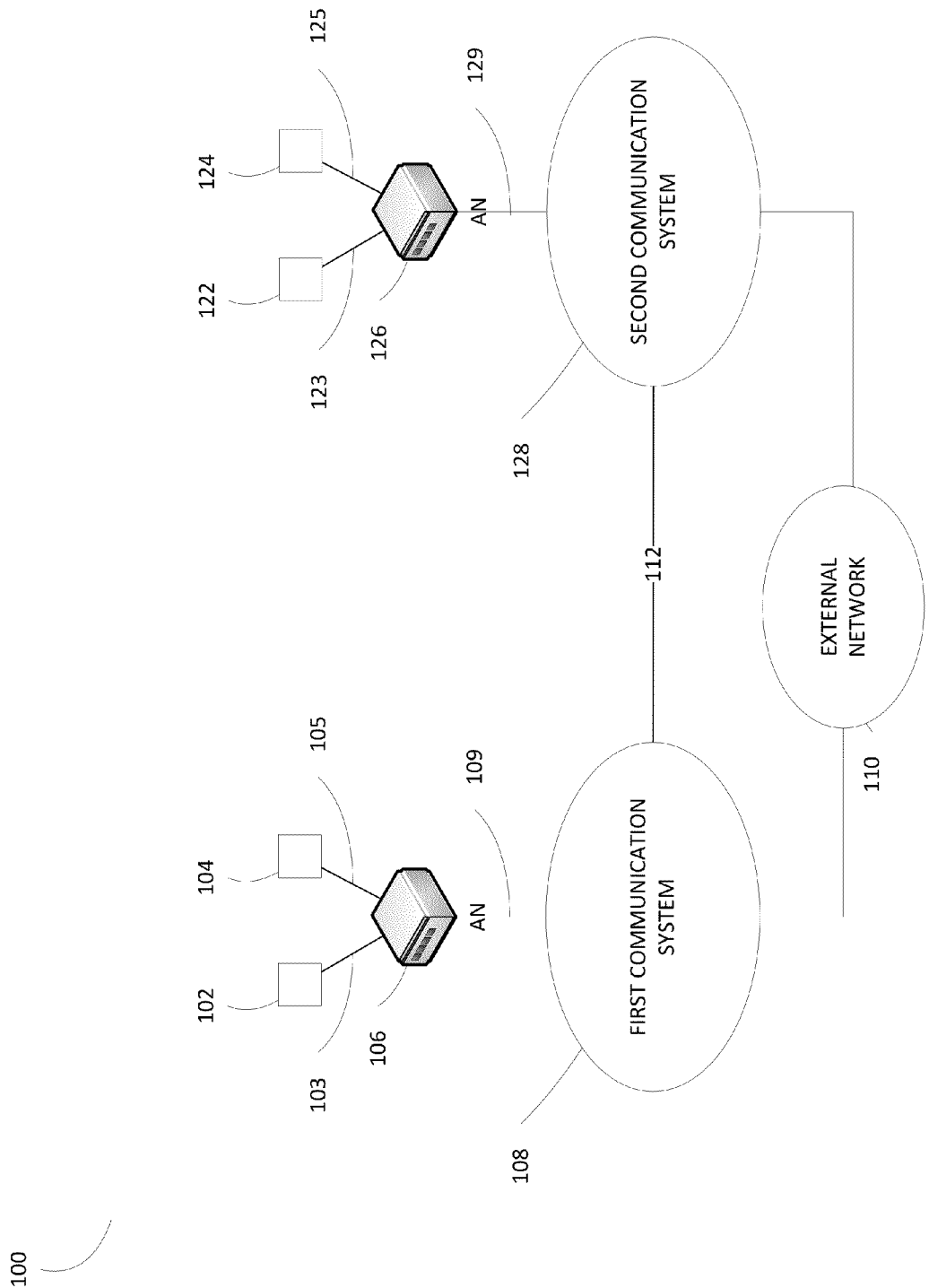
FIG. 1 includes a schematic diagram illustrating certain aspects of an exemplary embodiment.

FIG. 1 illustrates communication environment 100 according to certain aspects of an exemplary embodiment. Communication environment 100 comprises first communication system 108 and second communication system 128. Each system may be implemented using one or more communication protocols, such as Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication format.

Communication systems 108 and 128 include access nodes 106 and 126, respectively, and may serve wireless devices 102 and 104, and 122 and 124, respectively. Wireless devices 102, 104, 122, and 124 may include any electronic device that may be used for voice and/or data communication over a wireless communication system. Examples of wireless devices include, but are not limited to, cellular phones, personal digital assistants (PDAs), handheld devices, wireless modems, laptop computers, and personal computers. Access nodes 106 and 126 may provide half-duplex voice service, full-duplex voice service, and circuit switch/packet data service to wireless devices 102 and 104, and 122 and 124, respectively.

Wireless devices 102 and 104 may communicate with access node 106 over wireless links 103 and 105, respectively. Wireless devices 122 and 124 may communicate with access node 126 over wireless links 123 and 125, respectively. The wireless links use the air or space as their transport media and may use various protocols, such as iDEN, CDMA, EVDO, WiMAX, GSM, LTE, WIFI, HSPA, or some other wireless communication format.

Access nodes 106 and 126 may communicate with communication systems 108 and 128, respectively, over communication links 109 and 129, respectively. The communication links 109 and 129 may use metal, glass, air, space, or some other material as the transport media and may use various communication protocols, such as Internet Protocol (IP), Ethernet, or some other communication format—including combinations thereof. Communication links 109 and 129 may be direct links or may include intermediate networks, systems, or devices.

Access nodes 106 and 126 may include access node radios and control equipment contained in a base transceiver station (BTS), or cell site. However, an access node according to the present embodiment is not so limited and may be configured differently. Access nodes 106 and 126 may be used to provide a link between communication systems 108 and 128, respectively, and the various wireless devices 102, 104, 122, and 124, and may further provide connectively between the wireless devices and an external network 110. The external network 110 may be the Internet, a wide area network (WAN), a local area network (LAN), an intranet, another carrier network, or other type of packet-switch network.

Communication systems 108 and 128 may communicate with each other via external network 110 or may linked directly via dedicated link 112. The dedicated communication link 112 may use metal, glass, air, space, or some other material as the transport media and may use various communication protocols, such as Internet Protocol (IP), Ethernet, or some other communication format—including combinations thereof. Communications systems 108 and 128 may be managed by a first network operator and a second network operator, respectively, or may be managed by the same network operator, without departing from the spirit of the disclosure.

In the exemplary embodiment, wireless devices 102 and 104 are subscribers of first communication system 108 and wireless devices 122 and 124 are subscribers of second communication system 128. Furthermore, a wireless subscriber of the first communication system 108 may roam into a service area of the second communication system 128 and obtain communication services from the second communication system 128, and vice versa. However, the present disclosure is not so limited. For example, wireless device 102 may be a subscriber of the first communication system 108 and the second communication system 128 without departing from the spirit of the disclosure.

Figure 2:
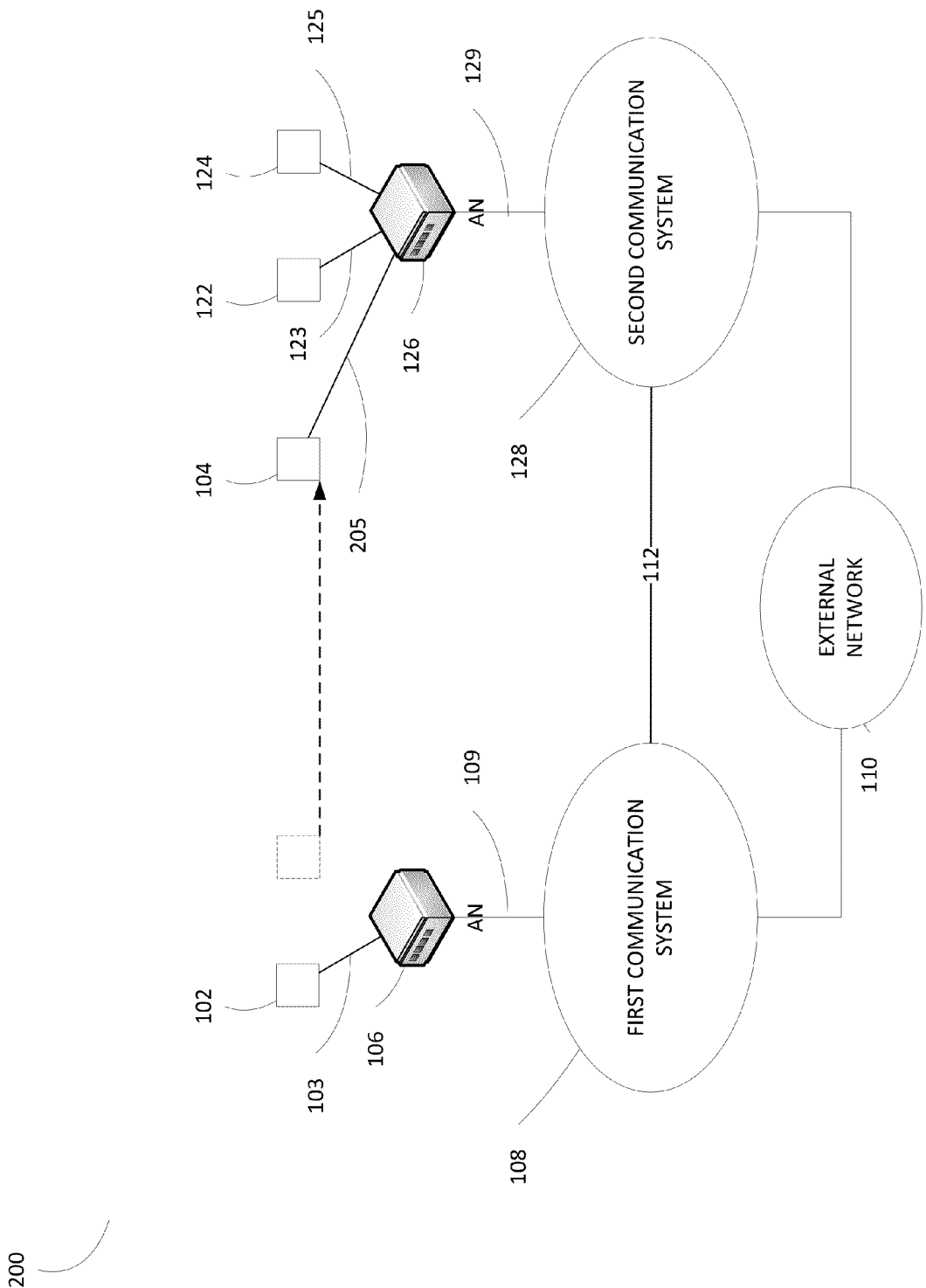
FIG. 2 includes a schematic diagram illustrating certain aspects of an exemplary embodiment.

FIG. 2 illustrates communication environment 200 according to certain aspects of an exemplary embodiment. In particular, FIG. 2 illustrates wireless device 104 roaming into the service area of the second communication system 128 and accessing communication services from the second communication system 128 through wireless link 205.

Figure 3:
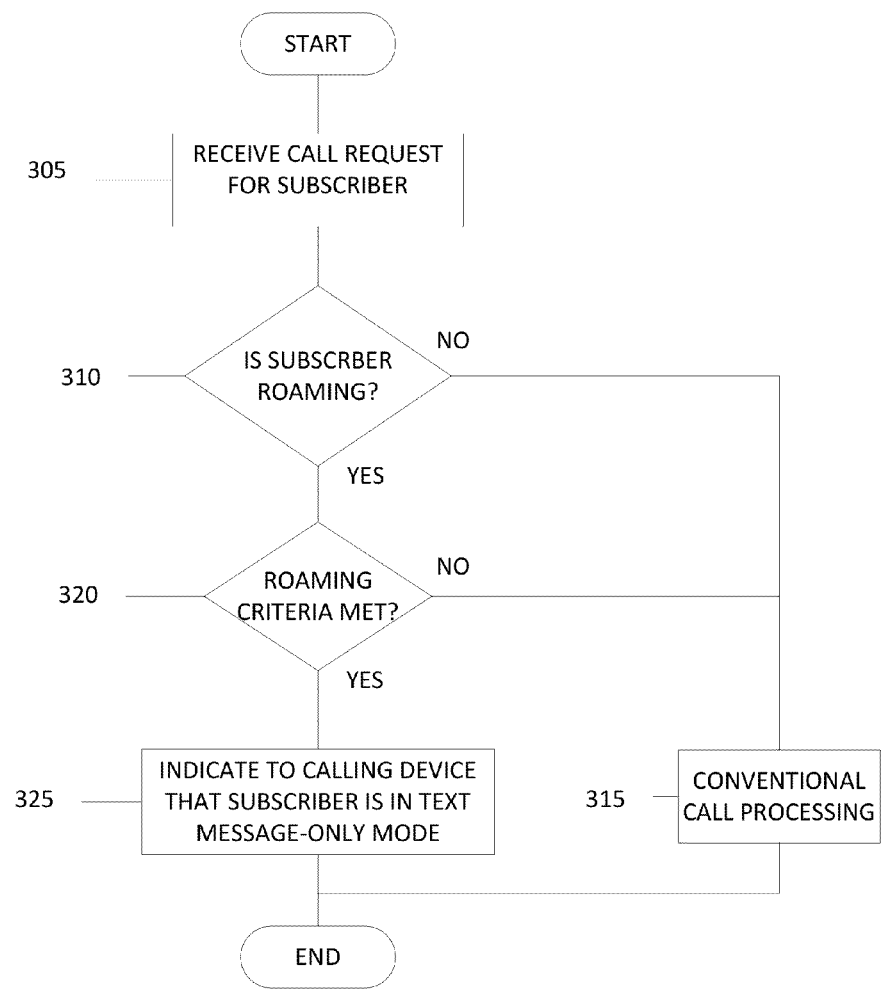
FIG. 3 includes a flowchart illustrating a process of an exemplary embodiment.

FIG. 3 illustrates a process 300 for operating first communication system 108 of communication environment 200 according to an exemplary embodiment. When wireless device 104 roams into the service area of the second communication system 128, as shown in FIG. 2, the operator of the second communication system 128 may provide access and services to wireless device 104 and charge the operator of the first communication system 108 for the access and services.

When the first communication system 108 receives a call request from wireless device 102 for wireless device 104 (S305), the first communication system 108 determines if wireless device 104 is roaming (S310). When wireless device 104 is not roaming, the first communication system 108 processes the call in a conventional manner (S315). When wireless device 104 is roaming (as shown in FIG. 2), the first communication system 108 determines whether a roaming usage of wireless device 104 meets a roaming criteria (S320).

The roaming criteria may be based on, for example, how many minutes of air time wireless device 104 has spent roaming (i.e., wireless device 104 roaming usage) during a predetermined period of time (day, week, etc. . . . ), a current billing cycle, a previous billing cycle, wireless device 104's subscription plan, or a combination thereof.

When wireless device 104 roaming usage does not meet the roaming criteria, the first communication system 108 processes the call in a conventional manner (S315). When wireless device 104 roaming usage meets the roaming criteria, the first communication system 108 sends a message to wireless device 102 indicating that wireless device 104 is in text message-only mode (S325).

In the present exemplary embodiment a communication system forwards calls to a wireless device based on whether the wireless device is roaming and its roaming usage has met a roaming criteria. When the device is roaming and meets the roaming criteria, the communication system handles a call request for the device as if the device is operating in text message-only mode. When in text message-only mode, non-text-message calls to the wireless device are not forwarded to the wireless device and the caller is informed of the wireless device's status such that, if the caller chooses to, the caller may send a text message to the wireless device. Thus, the exemplary embodiment may help the subscriber and/or the network operator of the communication system manage incoming calls.

In an exemplary embodiment, each access node in the communication system may be aware of which wireless devices in the communication system are being served as if they were operating in text-message only mode and, upon receiving a call request directed towards such a wireless device, immediately notify the calling device that the destination device may only receive a text message. Such an embodiment may provide increased bandwidth efficiency because the call request remains at the access node and is not propagated through the communication network and transmitted over the air to the destination device. Furthermore, such an embodiment may reduce operator costs and/or subscriber costs because roaming charges may be significantly reduced.

The above-described steps may be performed at one or more elements of a communication system, such as an access node, a Dispatch Application Processor (DAP) (not shown), a Mobile Switching Center (MSC) (not shown), another network element (not shown), or a combination thereof. A communications network including these and other network elements will be described in detail with respect to FIG. 6.

Figure 4:
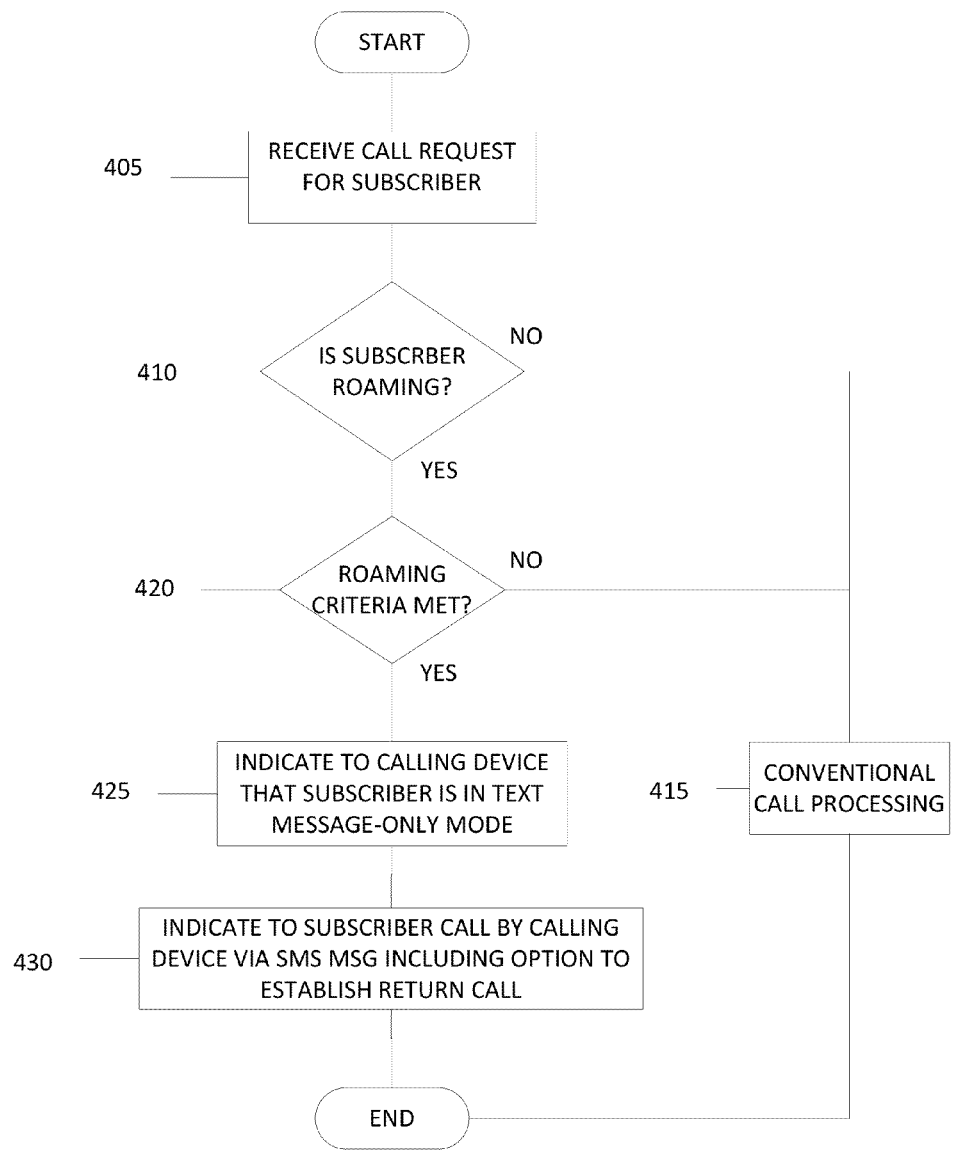
FIG. 4 includes a flowchart illustrating a process of another exemplary embodiment.

FIG. 4 illustrates a process 400 for operating first communication system 108 of communication environment 200 according to another exemplary embodiment. When wireless device 104 roams into the service area of the second communication system 128, as shown in FIG. 2, the operator of the second communication system 128 may provide access and services to wireless device 104 and charge the operator of the first communication system 108 for the access and services.

When the first communication system 108 receives a call request from wireless device 102 for wireless device 104 (S405), the first communication system 108 determines if wireless device 104 is roaming (S410). When wireless device 104 is not roaming, the first communication system 108 processes the call in a conventional manner (S415). When wireless device 104 is roaming (as shown in FIG. 2), the first communication system 108 determines whether a roaming usage of wireless device 104 meets a roaming criteria (S420).

The roaming criteria may be based on, for example, how many minutes of air time wireless device 104 has spent roaming (i.e., wireless device 104 roaming usage) during a predetermined period of time (day, week, etc....), a current billing cycle, a previous billing cycle, wireless device 104's subscription plan, or a combination thereof.

When wireless device 104 roaming usage does not meet the roaming criteria, the first communication system 108 processes the call in a conventional manner (S415). When wireless device 104 roaming usage meets the roaming criteria, the first communication system 108 sends a message to wireless device 102 indicating that wireless device 104 is in text message-only mode (S425), and further sends a message to wireless device 104 indicating that wireless device 102 called, the message including an option to establish a call with wireless device 102 (S430). The message to wireless device 104 may comprise a Short Messaging System (SMS) message, an email, or any other form of text communication.

In the present exemplary embodiment a communication system forwards calls to a wireless device based on whether the wireless device is roaming and its roaming usage has met a roaming criteria. When the device is roaming and meets the roaming criteria, the communication system handles the call request for the device as if the device is operating in text message-only mode. When in text message-only mode, non-text-message calls to the wireless device are not forwarded to the wireless device and the caller is informed of the wireless device's status such that, if the caller chooses to, the caller may send a text message to the wireless device. Furthermore, the wireless device is informed that a non-text-message call was received by the communication network. Thus, the exemplary embodiment may help the subscriber and/or the network operator of the communication system manage incoming calls.

In an exemplary embodiment, each access node in the communication system may be aware of which wireless devices in the communication system are being served as if they were operating in text-message only mode and, upon receiving a call request directed towards such a wireless device, immediately notify the calling device that the destination device may only receive a text message. Such an embodiment may provide increased bandwidth efficiency because the call request remains at the access node and is not propagated through the communication network and transmitted over the air to the destination device. Furthermore, such an embodiment may reduce operator costs and/or subscriber costs because roaming charges may be significantly reduced.

The above-described steps may be performed at one or more elements of a communication system, such as an access node, a Dispatch Application Processor (DAP) (not shown), a Mobile Switching Center (MSC) (not shown), another network element (not shown), or a combination thereof. A communications network including these and other network elements will be described in detail with respect to FIG. 6.

Figure 5:
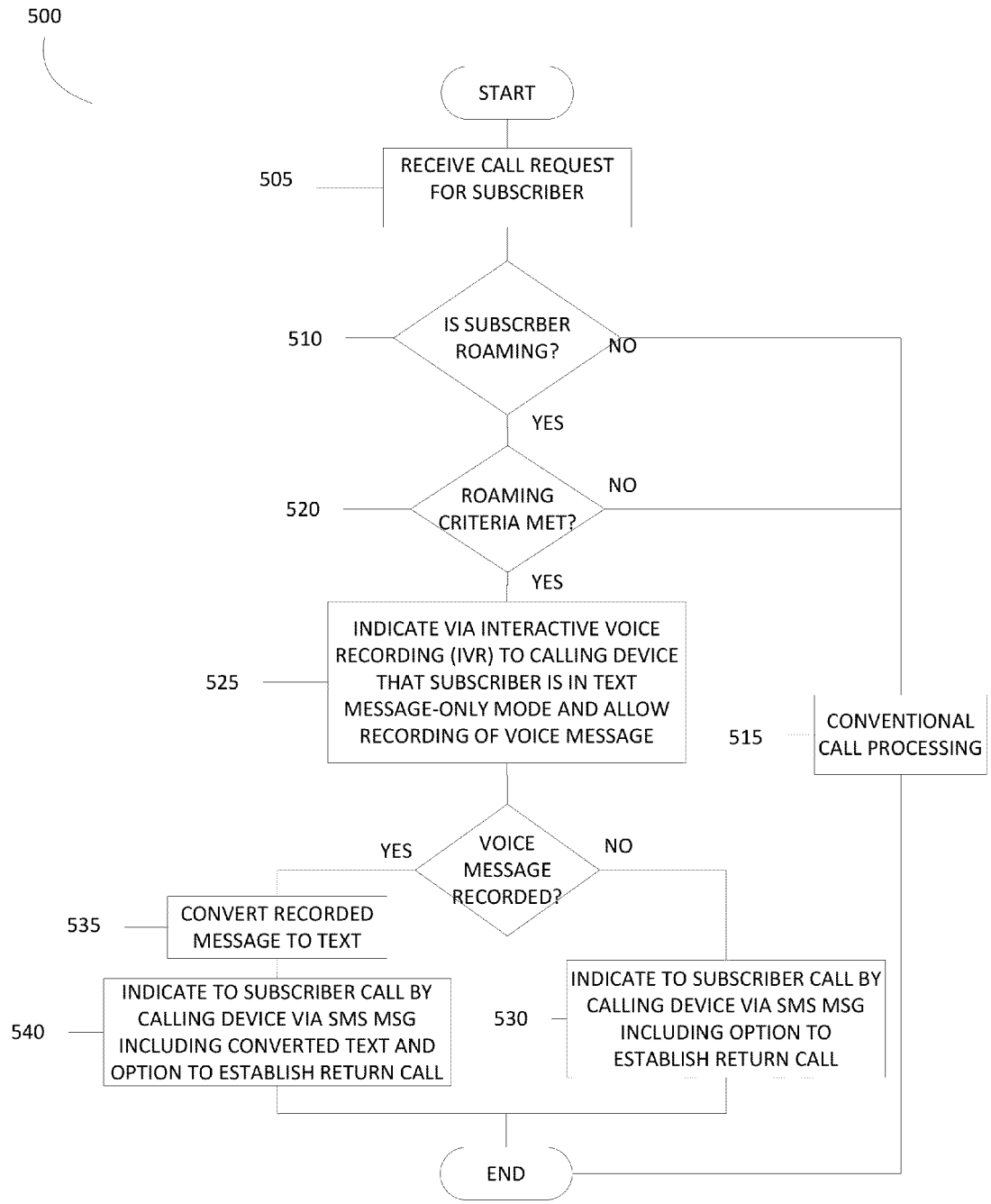
FIG. 5 includes a flowchart illustrating a process of yet another exemplary embodiment of the present teachings.

FIG. 5 illustrates a process 500 for operating first communication system 108 of communication environment 200 according to yet another exemplary embodiment. When wireless device 104 roams into the service area of the second communication system 128, as shown in FIG. 2, the operator of the second communication system 128 may provide access and services to wireless device 104 and charge the operator of the first communication system 108 for the access and services.

When the first communication system 108 receives a call request from wireless device 102 for wireless device 104 (S505), the first communication system 108 determines if wireless device 104 is roaming (S510). When wireless device 104 is not roaming, the first communication system 108 processes the call in a conventional manner (S515). When wireless device 104 is roaming (as shown in FIG. 2), the first communication system 108 determines whether a roaming usage of wireless device 104 meets a roaming criteria (S520).

The roaming criteria may be based on, for example, how many minutes of air time wireless device 104 has spent roaming (i.e., wireless device 104 roaming usage) during a predetermined period of time (day, week, etc....), a current billing cycle, a previous billing cycle, wireless device 104's subscription plan, or a combination thereof.

When wireless device 104 roaming usage does not meet the roaming criteria, the first communication system 108 processes the call in a conventional manner (S515). When wireless device 104 roaming usage meets the roaming criteria, the first communication system 108 provides wireless device 102 an interactive voice recording (IVR) indicating that wireless device 104 is in text message-only mode and only accepts text messages at this time (S525), and further allows the second device to record a voice message for the first device (S525).

When wireless device 102 does not record a voice message, the first communication system 108 sends a message to wireless device 104 indicating that wireless device 102 called, the message including an option to establish a call with wireless device 102 (S530). The message to wireless device 104 may comprise an SMS message, an email, or any other form of text communication. When wireless device 102 records a voice message, the first communication system 108 converts the recorded message to text by using any known-in-the-art voice-to-text implementation (S535) and sends a message to wireless device 104 indicating that wireless device 102 called, the message including the converted text and an option to establish a call with wireless device 102 (S540). The message to wireless device 104 may comprise an SMS message, an email, or any other form of text communication.

In the present exemplary embodiment a communication system forwards calls to a wireless device based on whether the wireless device is roaming and its roaming usage has met a roaming criteria. When the device is roaming and meets the roaming criteria, the communication system handles the call as if the device is operating in text message-only mode. When in text message-only mode, non-text-message calls to the wireless device are not forwarded to the wireless device and the caller is informed of the wireless device's status such that, if the caller chooses to, the caller may send a text message to the wireless device. Furthermore, the communication system provides to the caller the option to record a voice message, which may be converted to text and forwarded to the wireless device as a text message. Thus, the exemplary embodiment may help the subscriber and/or the network operator of the communication system manage incoming calls.

In an exemplary embodiment, each access node in the system may be aware of which wireless devices in the communication system are being served as if they were operating in text-message only mode and, upon receiving a call request directed towards such a wireless device, immediately notify the calling device that the destination device may only receive a text message. Such an embodiment may provide increased bandwidth efficiency because the call request remains at the access node and is not propagated through the communication network and transmitted over the air to the destination device. Furthermore, such an embodiment may reduce operator costs and/or subscriber costs because roaming charges may be significantly reduced.

The above-described steps may be performed at one or more elements of a communication system, such as an access node, a Dispatch Application Processor (DAP) (not shown), a Mobile Switching Center (MSC) (not shown), another network element (not shown), or a combination thereof. A communications network including these and other network elements will be described in detail with respect to FIG. 6.

As used herein, the term "wireless device" refers to an electronic device that may be used for voice and/or data communication over a wireless communication system. Examples of wireless devices include, but are not limited to, cellular phones, personal digital assistants (PDAs), handheld devices, wireless modems, laptop computers, and personal computers. A wireless device may alternatively be referred to as an access terminal, a mobile terminal, a mobile station, a subscriber station, a remote station, a user terminal, a terminal, a subscriber unit, a mobile device, a user equipment, or some other similar terminology.

A wireless device may include a communication interface and processing elements configured to operate as described in the present teachings. Communication interface elements may include an antenna (or antennas) coupled to Radio Frequency (RF) communication circuitry that processes RF signals received over the antenna. The RF communication circuitry typically includes at least an amplifier, filter, modulator, and signal processing circuitry. A wireless device may also include a user interface, memory device, software, processing circuitry, or some other communication components.

The term "access node" refers to a wireless communication station that is installed at a fixed location and used to communicate with mobile units. An access node may alternatively be referred to as an access point, a Node B, an evolved Node B, or some other similar terminology. An access node includes RF communication circuitry and an antenna. The RF communication circuitry typically includes an amplifier, filter, RF modulator, and signal processing circuitry. An access node may also include a router, server, memory device, software, processing circuitry, cabling, power supply, network communication interface, structural support, or some other communication apparatus.

An access node may communicate with one or more wireless devices via transmissions on the uplink and the downlink. The uplink (or reverse link) refers to the communication link from the wireless device to the access node, and the downlink (or forward link) refers to the communication link from the access node to the wireless device. A variety of multiple access techniques are known, including integrated Digital Enhanced Network (iDEN), Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), and so forth.

Communication between wireless devices and between wireless devices and access nodes may be in the form of text messages. Common communications protocols for text messages are Short Message Service (SMS) and Multimedia Message Service (MMS). In text messaging, a user of a first wireless device enters a text message on the wireless device, enters a telephone number of a second wireless device, and then sends the message through a communication system to the second wireless device. The second device's user can, if the second device is text-enabled, read the message on the device's display.

An advantage of text messages over voice communication is that a text message can be read and replied to quietly and at the convenience of the recipient so that the pace of a text message exchange naturally adjusts to the circumstances of both participants. The text message can then be sent on the paging channel or traffic channel as per the length of the text message, and its transmission may be scheduled according to the communication system's load and capacity.

Figure 6:
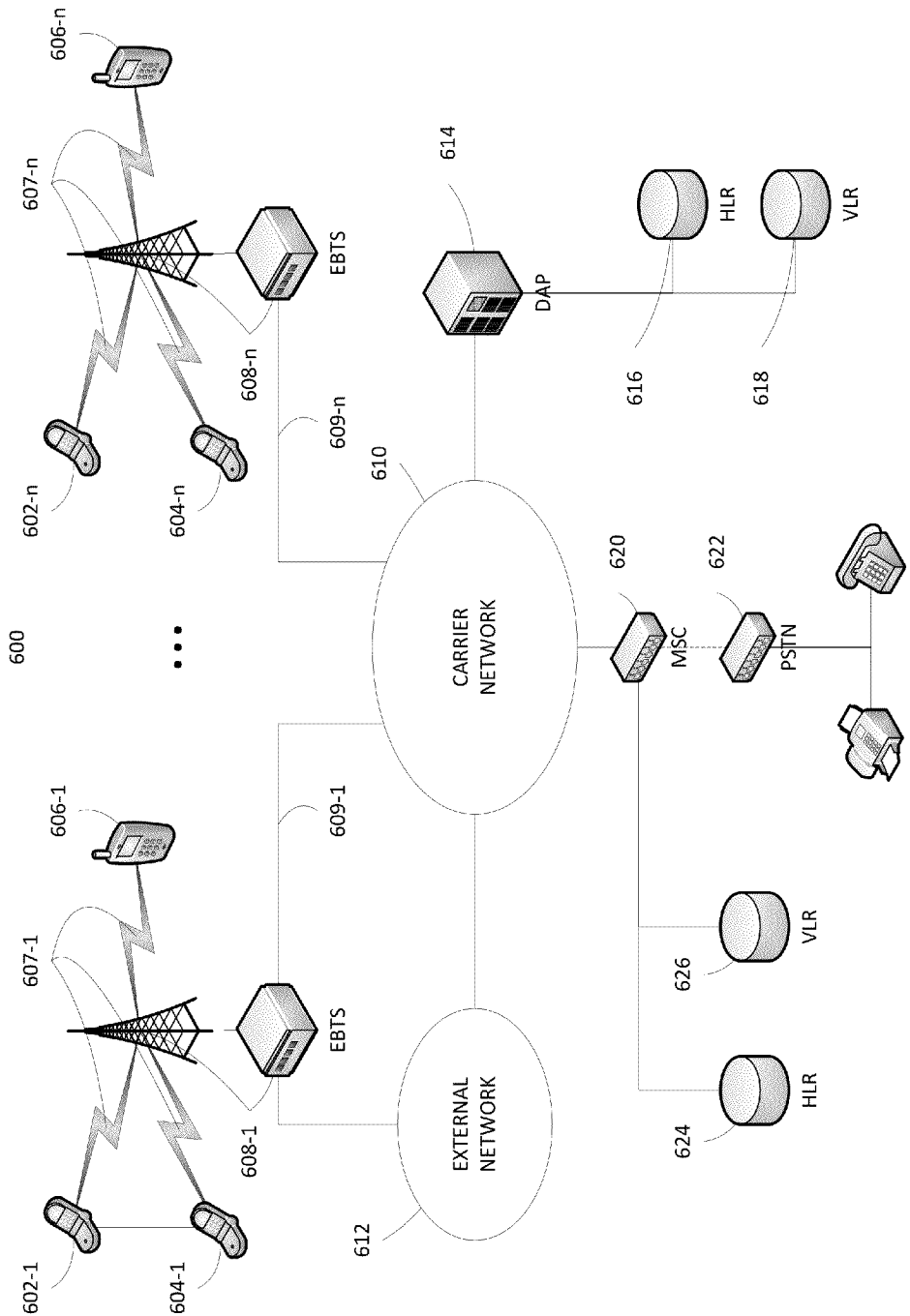
FIG. 6 includes a schematic diagram of an exemplary embodiment.

FIG. 6 illustrates a communication system 600 of an exemplary embodiment. Communication system 600 is a system which uses the integrated digital enhanced network (iDEN) protocol. However, the present disclosure is not so limited, and may be implemented in systems using various communication protocols, such as Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication format.

Communication system 600 serves a plurality of dispatch wireless devices 602-1 to 602-n, a plurality of interconnect wireless devices 604-1 to 604-n, and a plurality of SMS wireless devices 606-1 to 606-n, all of which may communicate with a plurality of access nodes 608-1 to 608-n.

In the case of dispatch wireless devices 602-1 to 602-n, access nodes 608-1 to 608-n may provide half-duplex voice service, thereby allowing users to communicate with each other (or with external entities) by way of half-duplex voice. In the case of interconnect wireless devices 604-1 to 604-n, access nodes 608-1 to 608-n may provide full-duplex voice service, thereby allowing users to communicate with each other (or with external entities) by way of full-duplex voice. And in the case of SMS wireless devices 606-1 to 606-n, access nodes 608-1 to 608-n may allow users to transmit circuit switch/packet data with each other (or with external entities). For discussion purposes, the various subscriber units of FIG. 6 will be referred to hereinafter as wireless devices 602-606.

Wireless devices 602-606 communicate with access nodes 608-1 to 608-n over wireless links 607-1 to 607-n, respectively. Wireless links 607-1 to 607-n use the air or space as their transport media and may use various protocols, such as iDEN, CDMA, EVDO, WiMAX, GSM, LTE, WIFI, HSPA, or some other wireless communication format.

Access nodes 608-1 to 608-n communicate with communication network 610 over communication links 609-1 to 609-n, respectively. Communication links 609-1 to 609-n may use metal, glass, air, space, or some other material as the transport media and may use various communication protocols, such as Internet Protocol (IP), Ethernet, or some other communication format—including combinations thereof. Communication links 609-1 to 609-n could be a direct link or may include intermediate networks, systems, or devices.

Access nodes 608-1 to 608-n may include access node radios and control equipment contained in an enhanced base transceiver station (EBTS), or cell site. However, an access node according to the present disclosure is not so limited and may be configured differently.

Access nodes 608-1 to 608-n may be used to provide a link between the carrier network 610 and the various wireless devices 602-606, and may further provide connectively between wireless devices 602-606 and an external network 612. The external network 612 may be the Internet, a wide area network (WAN), a local area network (LAN), an intranet, another carrier network, or other type of packet-switch network.

Communication system 600 further includes a Dispatch Application Processor (DAP) 614. The DAP 614 may coordinate and control dispatch and packet data services. Moreover, the DAP 614 may provide first-time registration for all interconnect and dispatch subscribers, as well as maintenance and tracking of subscriber mobility for dispatch and packet data.

Communication system 600 further includes a Dispatch Home Location Register (D-HLR) 616, which includes a database that stores information about dispatch access rights and features allocated to each wireless device 602-606. The D-HLR 616 may be queried each time a dispatch call is initiated or call features requested, which may function as an access control mechanism. For each dispatch wireless device 602-1 to 602-n, the D-HLR database 616 may contain an International Mobile Equipment Identifier (IMEI), a billing number or International Mobile Subscriber Identity (IMSI), as well as other dispatch-related group and fleet ID information. Additional individual service provider policies and procedures may also be contained in the D-HLR 616.

Communication system 600 further includes a DAP-Visited Location Register (D-VLR) 618, which includes a Random Access Memory (RAM) resident database that contains the most recent location information on each wireless device 602-606. As a wireless device 602-606 moves out of an area, it will report its new location to the DAP, which in turn may update the D-VLR 618. The D-VLR 618 may contain the identification data for the wireless device in question, as well as subscriber data and the current status of the wireless device.

Communication system 600 further includes a mobile switching center (MSC) 620 which provides interconnect services. The MSC 620 may functions as the interface between the carrier network 610 and other service provider's public switch telephone networks (PSTN) 622. While FIG. 1 depicts a single PSTN 622 coupled to the MSC 620, it should be understood that numerous MSCs 620 may similarly be coupled thereto.

During an interconnect call, wireless devices 602-606 may be validated by the Home Location Register (HLR) database 624. It should be appreciated that the HLR 624 may exist as a separate system or as an integrated part of the MSC 620. In one embodiment, the HLR 624 is used to maintain usage data, billing data, and service data for each wireless device 602-606. In short, the HLR 624 ensures that the services to which each wireless device 602-606 subscribes are maintained throughout the communication network 600.

The processes illustrated in FIGS. 3-5, and previously described with respect to exemplary embodiments for operating communication system 108, may be applied for operating carrier network 610. For example, with respect to FIG. 3, carrier network 610 may receive from a first device, such as 606-1, a call request to communicate with a subscriber device which is roaming (not shown) (S305).

The communication network determines whether the subscriber device is roaming (S310). When the subscriber device is roaming, the communication network determines whether the subscriber meets a roaming criteria (S320). When the subscriber meets the roaming criteria, the communication network notifies first device 606-1 that the subscriber is in text-only mode and only accepts text messages at this time (S325).

In the exemplary embodiment, access node 608-1 may be aware that the wireless device is currently roaming, and that the wireless device's roaming usage meets a roaming criteria. Thus, upon receiving a call request directed towards such a wireless device, access node 608-1 may immediately notify the calling device that the wireless device may only receive a text message. Such an embodiment provides increased bandwidth efficiency because the call request remains at the access node and is not propagated through the communication network and transmitted over the air to the roaming wireless device. The above-described steps may also be performed at DAP 614, MSC 620, another network element, or a combination thereof.

Figure 7:
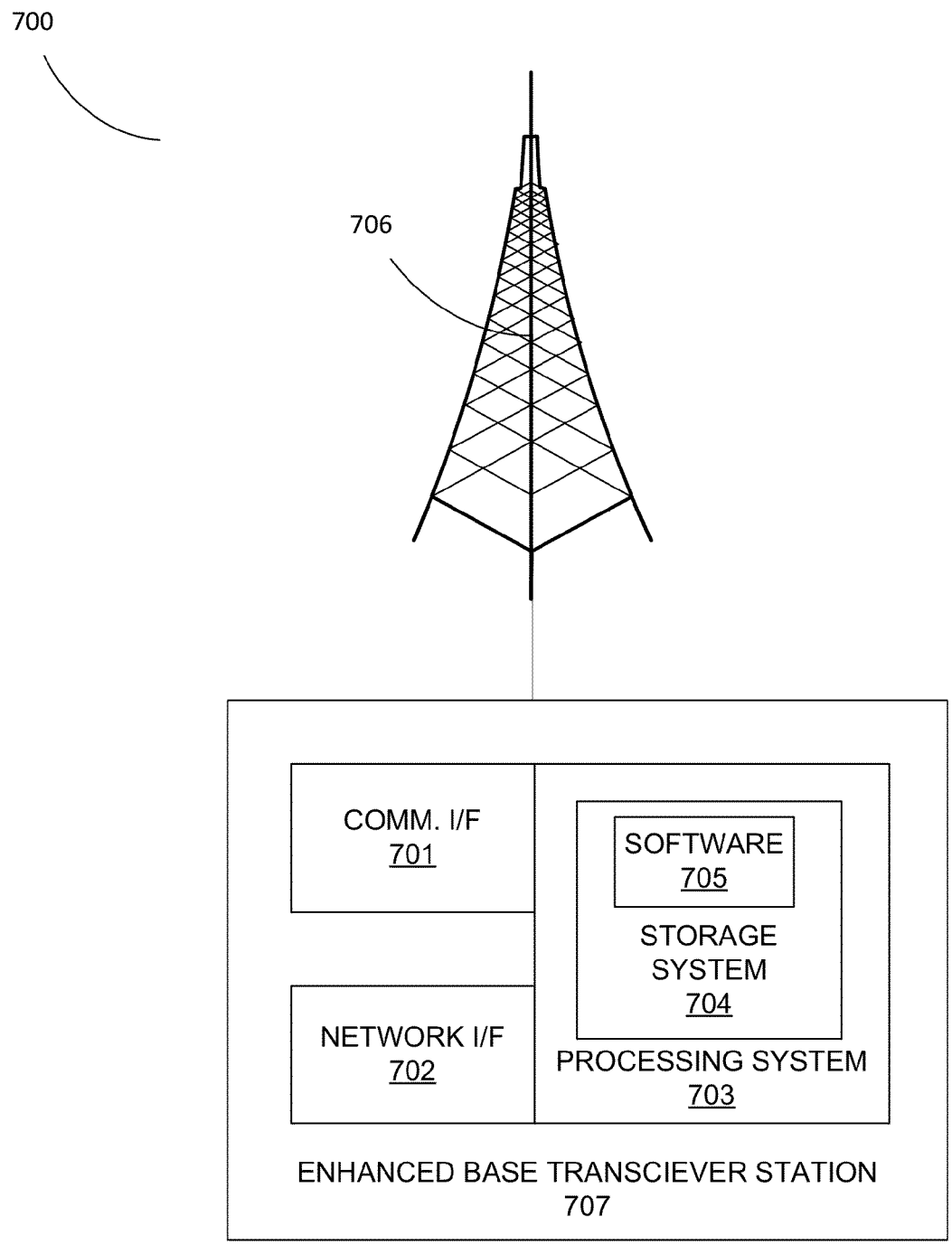
FIG. 7 illustrates an access node according to an exemplary embodiment.

FIG. 7 illustrates an access node 700 according to an exemplary embodiment. Access node 700 is an example of access nodes 106 and 126 of FIG. 1. Access node 700 includes radio antenna 706 and enhanced base transceiver station (EBTS) 707. EBTS 707 includes wireless communication interface 701, network interface 702, and processing system 703. Processing system 703 is linked to wireless communication interface 701 and network interface 702. Processing system 703 includes processing circuitry and storage system 704 that stores software 705. Access node 700 may include other well-known components such as a battery and enclosure that are not shown for clarity.

Wireless communication interface 701 includes at least RF communication circuitry to interface with radio antenna 706. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as WiMAX, iDEN, CDMA, CDMA2000, WCDMA EVDO, GSM, LTE, WIFI, HSPA, or some other wireless communication format to communicate wirelessly with access nodes.

Network interface 702 includes components that interact with a communications network to communicate with other network elements such as an MSC, DAP, and other access nodes. Network interface 702 may allow the access node to communicate with the communications network via fiber optic cable, coax cable, or through a wireless link.

Processing system 703 may include a microprocessor and other circuitry that retrieves and executes software 705 from storage system 704. Storage system 704 includes a disk drive, flash drive, data storage circuitry, or some other memory apparatus. Processing system 704 is typically mounted on a circuit board that may also hold storage system 704 and portions of communication interface 701 and user interface 702. Software 705 includes computer programs, firmware, or some other form of machine-readable processing instructions. Software 705 may include an operating system, utilities, drivers, network interfaces, applications, or some other type of software. When executed by processing system 703, software 705 directs processing system 703 to operate access node 700 as described herein for access nodes 106 and 126.

Some or all of the actions performed by the exemplary embodiments described herein can be performed under the control of a computer system executing computer-readable codes either in a computer-readable recording medium or in communication signals transmitted through a transmission medium. The computer-readable recording medium is any data storage device that can store data for a non-fleeting period of time such that the data can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transmission medium may include, for example, signals which modulate carrier waves transmitted through wired or wireless transmission paths.

The above description and associated figures teach the best mode of the invention. Other embodiments will be apparent to those skilled in the art from consideration of the specification and practice of the teachings disclosed herein. It is intended that the specification and examples be considered as exemplary only, with a true scope and spirit invention being indicated by the following claims.

What is claimed is:

1. A method to manage a call in a communication system comprising:
    receiving, by the communication system, a call request for a voice call from a first device to communicate with a second device, wherein the second device is a subscriber of the communication system; and
    transmitting, by the communication system to the first device, a first message comprising an indication that the second device is operating in a text message-only mode, when the second device is roaming and a roaming usage of the second device meets a roaming criteria, wherein the roaming criteria comprises the second device having a roaming usage during a previous billing period above a first threshold roaming usage and having a roaming usage during a current billing period above a second threshold roaming usage, and wherein the first threshold roaming usage and the second threshold roaming usage are based on a subscription term of the second device's subscription with the communication system.

2. The method of claim 1, wherein the roaming criteria comprises the second device having a roaming usage during a current billing period above a threshold roaming usage.

3. The method of claim 2, wherein the threshold roaming usage is based on a subscription term of the second device's subscription with the communication system.

4. The method of claim 1, wherein the second device comprises a wireless device and the communication system comprises a wireless communication system.

5. The method of claim 4, further comprising:
    transmitting, by the communication system to the second device, a second message comprising an indication of a call by the first device and an identification of the first device, when the second device is roaming and a roaming usage of the second device meets a roaming criteria.

6. The method of claim 5, wherein the second message comprises a Short Message Service text message and an option to establish a voice call with the first device.

7. The method of claim 4, wherein the first message further comprises a voice recording.

8. The method of claim 7, wherein the voice recording comprises an option to record a voice message for the second device.

9. The method of claim 8 further comprising:
    transmitting, by the communication system to the second device, a second message comprising an indication of a call by the first device, an identification of the first device, and an indication that a voice message has been recorded by the first device, when the first device records the voice message.

10. The method of claim 9, wherein the second message further comprises an option to establish a voice call with the first device.

11. The method of claim 7 further comprising:
    converting, by the communication system, a voice message recorded by the first device to text, when the first device records the voice message; and
    transmitting, by the communication system to the second device, a second message comprising an indication of a call by the first device, an identification of the first device, the converted text in a text message, and an option to establish a voice call with the first device, when the second device records the voice message.

12. An access node of a wireless communication system, comprising:
    a radio frequency interface to communicate through a wireless communication link with a subscriber device of the wireless communication system;
    a data communication interface to communicate through a network communication link with a communication network; and
    a processing system to process data associated with the wireless communication link and the network communication link, wherein the processing system comprises a storage unit and a processing unit;
    wherein the access node is configured to:
        transmit to a calling device a first message comprising an indication that a subscriber device is operating in a text message-only mode, when the calling device requests to establish a call with the subscriber device, the subscriber device is roaming, and a roaming usage of the subscriber device meets a roaming criteria, wherein the roaming criteria comprises the subscriber device having a roaming usage during a current billing period above a threshold roaming usage and the threshold roaming usage is based on a subscription term of the second device's subscription with the communication system.

13. The access node of claim 12, wherein the roaming criteria comprises the subscriber device having a roaming usage during a previous billing period above a first threshold roaming usage and having a roaming usage during a current billing period above a second threshold roaming usage, and wherein the first threshold roaming usage and the second threshold roaming usage are based on a subscription term of the subscriber device's subscription with the communication system.

14. The access node of claim 12, further configured to:
    transmit a second message for the subscriber device comprising an indication of a call by the calling device and an identification of the calling device, when the calling device requests to establish a call with the subscriber device, the subscriber device is roaming, and a roaming usage of the subscriber device meets a roaming criteria.

15. The access node of claim 14, wherein the second message comprises a Short Message Service text message and an option to establish a voice call with the calling device.

16. The access node of claim 12, wherein the first message further comprises a voice recording comprising an option to record a voice message for the subscriber device.

17. The access node of claim 16, further configured to:
    transmit a second message for the subscriber device comprising an indication of a call by the first device, an identification of the first device, and an indication that a voice message has been recorded by the first device, when the first device records the voice message.

18. The access node of claim 16, further configured to:
    convert a recorded voice message to a text message, when the first device records the voice message; and
    transmit a second message for the subscriber device comprising an indication of a call by the first device, an identification of the first device, and the converted text message, when the first device records the voice message.

* * * * *